2,833,612
RESTORATION OF FADED INK WRITINGS

Lloyd H. Almy, Pittsburgh, Pa., assignor to
Carl E. Hultman, Pittsburgh, Pa.

No Drawing. Application July 22, 1957
Serial No. 673,135

10 Claims. (Cl. 8—7)

This invention relates to a method of restoring faded writing made with iron inks, and this application is a continuation-in-part of my copending application Serial No. 424,249, filed April 19, 1954.

It is well known that writings made with iron inks such, for example, as iron-tannin inks, fade with the passage of time due presumably, to oxidation of the iron of the ink to ferric oxide ($Fe_2O_3$). Patent No. 2,182,672 describes and claims a method of restoring such faded writings in accordance with which the paper bearing the writing is treated with an acidified aqueous solution of an alkali metal halide, e. g., sodium chloride (NaCl), and potassium ferrocyanide [$K_4Fe(CN)_6$] after which the paper is washed and then subjected to the action of a solution of a compound, such as zinc chloride ($ZnCl_2$), to precipitate residual potassium ferrocyanide as an insoluble and stable substance of color contrasting to that of the revived ink characters, after which the paper is again washed and then dried.

The method of that patent has been used extensively over the years, but although it does act to restore the ink characters successfully, experience has shown that at times the restored characters show edge blurring, wherefore the appearance is impaired. Although the exact reason for such blurring is not known definitely, it may be due to migration of the Prussian blue formed by the treatment with alkali metal ferrocyanide, or it may be due to the formation of a slightly soluble modification of Prussian blue, or to other factors.

It is among the objects of this invention to provide an improved method of restoring faded iron ink writings with an acidic aqueous solution of a soluble alkali metal ferrocyanide and an alkali metal halide that satisfactorily restores the brilliance and legibility of the ink characters while suppressing edge blurring, that dispenses with the precipitating step of the aforesaid patented method, and that is rapid and easily performed.

A further object is to restore without edge blurring faded iron ink writings by means of aqueous acidic calcium or barium ferrocyanide, in which the use of alkali metal halide is not needed.

Other objects will be recognized from the following specification.

The invention is predicated in part upon my discovery that in the use of solutions containing an alkali metal ferrocyanide, an acid, and an alkali metal halide for ink restoring, edge blurring of the characters is suppressed satisfactorily by including in the solution a soluble alkaline earth salt. Not only is edge blurring thus no longer a problem, but also, as has been found by experience, it is no longer necessary after washing the treated paper to use the precipitation agent of the aforesaid patent.

The reason why edge blurring is suppressed in this way by the inclusion of a soluble alkaline earth salt in the revivifying solution is not known with certainty. It might be thought that since Prussian blue is a negative lyophobic sol its charge will be neutralized by ions supplying positive charges, and that the effectiveness of such positive ions would be in the order of the positive charge. In other words, the positive ions of an alkaline earth compound, which carry two positive charges, would be more effective than the alkali metal halide used in the prior practice. However, according to my experience the addition of mono-, di- and tri-valent metallic chlorides to solutions made in accordance with the foregoing patent gives no evidence that increased basicity of the cations gives increased protection against edge blurring. Furthermore, in past practice under the said patent NaCl has been used in such amount that it is present in the ratio of 300 or more parts to one part of $FeCl_3$, where HCl is used as the acid, yet edge blurring occurs. That concentration of sodium ions should be sufficient to precipitate the Prussian blue but it does not so that neutralization of the charge is not alone enough to avoid edge blurring.

Although not confining myself to any particular theory as to the action of the soluble alkaline earth salt, I now believe that it acts to suppress edge blurring by forming a modified Prussian blue in which a portion of the iron is replaced by alkaline earth metal. For instance, it is known that there is a potassium calcium ferrocyanide [$K_2CaFe(CN)_6$] which is sparingly soluble (Thorpe's Dictionary of Applied Chemistry, 4th ed., vol. III, p. 468 ff.). Whether or not the alkaline earth cation present in the treating baths of this invention replaces a portion of the alkali metal of normal sodium or potassium ferrocyanide, which in turn reacts with the iron of the ink used in the writing to form a less soluble "Prussian blue" containing combined alkaline earth in the molecule tests that I have conducted have shown that when Prussian blue is precipitated from solutions used in practicing the method of the foregoing patent to which there has been added a soluble calcium or a soluble barium salt, the precipitate after thorough washing shows a fixation of the alkaline earth metal.

In the practice of this invention there is used, as in the past, an aqueous solution of an alkali metal ferrocyanide, such, for example, as sodium or potassium ferrocyanide, although the potassium compound is preferred for most purposes. The exact concentration is not critical, and as little as 0.1 percent by weight may be used. There is no practical upper limit so that higher concentrations may be used, if desired, although in general that is economically undesirable since low concentrations suffice. For many purposes it is preferred to use about 0.3 percent.

The solution likewise contains an alkali metal halide, suitably potassium or sodium chloride (KCl or NaCl). The halide serves chiefly for its mass action effect in forcing the revivifying reaction in the desired direction so that provided enough is present for that action its concentration is not critical. In the case of sodium chloride, about 5 percent by weight suffices.

The solution contains an acid also, which is believed to function to neutralize any alkalinity of the water used and to solubilize the iron of the writing for reaction to form Prussian blue with the ferrocyanide. The common mineral acids such as hydrochloric (HCl), sulfuric ($H_2SO_4$), nitric ($HNO_3$), and phosphoric ($H_3PO_4$), and others may be used. Organic acids may be used likewise, examples of the latter class being formic (HCOOH), acetic ($CH_3COOH$), chloracetic ($CH_2ClCOOH$), succinic [COOH.($CH_2)_2$.COOH], and others. The amount of acid present will, obviously, depend upon the particular acid used, but enough is to be present to neutralize any alkalinity of the water used in preparing the solution and to effect solubilization of the iron in the faded written characters. The acid used must, of course, be one that is compatible with other ions present, e. g. it should not form a precipitate with such other ions, and in the case of organic acids they should not develop a pH such that the iron will not be solubilized. The concentration is, of course, insufficient to injure the paper. As an example, in the case of hydrochloric acid of customary laboratory strength, the addition of about 0.2 percent by weight of the acid suffices for most purposes.

The major feature of the invention is that there is added to such a solution at least one soluble salt of calcium or barium. It is preferred to use the chlorides ($CaCl_2$; $BaCl_2$) although other halides such as the bromides ($CaBr_2$; $BaBr_2$) or iodides ($CaI_2$; $BaI_2$) may be used. Other soluble salts of these alkaline earth metals may be used likewise for example, such as the nitrates [$Ca(NO_3)_2$; $Ba(NO_3)_2$], the thiocyanates [$Ca(SCN)_2$; $Ba(SCN)_2$], the chlorates [$Ca(ClO_3)_2$; $Ba(ClO_3)_2$]. Here again the exact concentration is not critical although for most purposes from about 0.5 percent to as much as 20 percent by weight may be used. Of course, for economy the lowest effective amount will be used.

Although the calcium and barium salts are preferred, soluble salts of strontium (Sr) and magnesium (Mg) may be used although, according to my experience, they are less satisfactory, in general than the Ca and Ba salts. Although magnesium is commonly considered to be the transition element of group II, yet for the purposes of this invention it may be considered to be an alkaline earth metal.

In the practice of the invention, the solution as just described is made up with water, preferably heated to 35° to 50° C. to increase the rate of reaction, the paper carrying the faded ink writing is immersed in it for a period of time, usually under one minute, to permit the reactions to occur by which the written characters are revivified, after which the paper is withdrawn, washed thoroughly in hot or cold water and then dried. In this way, the brilliance of the inked characters is restored, edge blurring of the revivified characters is suppressed, and there is no discoloration, at least to any objectionable extent, of the paper itself. As will be observed, the second precipitation step of the above mentioned patented procedure is unnecessary, and the second washing operation is accordingly eliminated.

A further exemplification of the manner in which documents are restored in accordance with the invention: two trays A and B, of impervious material, such as hard rubber, glass or enameled iron, are placed on each side of a water spray, the document is immersed for 45 seconds in tray A containing 7570 ml. of water at 45° C., 15 ml. of reagent grade HCl (sp. gr. 1.19), 383 gm. of NaCl, 383 gm. of $CaCl_2.2H_2O$, and 24 gm. of $K_4Fe(CN)_6.3H_2O$. The document is then rinsed momentarily in the water spray, then placed for 45 seconds in tray B containing water at 45° C., and finally squeezed between rubber rolls and dried.

The water spray is not essential but is preferred.

As another example, the document is placed for 35 seconds in tray A containing 7570 ml. of water at 50° C., 20 ml. of HCl (sp. gr. 1.19), 300 gm. of NaCl, 190 gm. of $BaCl_2.2H_2O$, and 30 gm. of $K_4Fe(CN)_6.3H_2O$, rinsed momentarily in the water spray, placed for 35 seconds in tray B containing water at 50° C., squeezed between rubber rolls and then dried.

As indicated above, it is not known whether or not the alkaline earth compound reacts to produce a mixed insoluble ferrocyanide. However, I have found that the inked characters may be restored satisfactorily by the use of an aqueous solution of calcium ferrocyanide [$Ca_2Fe(CN)_6$] or barium ferrocyanide [$Ba_2Fe(CN)_6$] in concentrations within their solubility ranges in acid, acidified with a mineral acid other than sulfuric, and preferably other than phosphoric also, and that in this case the presence of an alkali metal salt and of a subsequent precipitation step are unnecessary.

According to the provisions of the patent statutes, I have explained the principle of my invention and have described what I now consider to represent its best embodiment. However I desire to have it understood that, within the scope of the appended claims, the invention may be practiced otherwise than as specifically described.

I claim:

1. In a method of restoring faded writings made from iron ink susceptible to oxidation with consequent color fading in which the writing is treated with an aqueous solution of an alkali metal ferrocyanide of the group consisting of $Na_4Fe(CN)_6$ and $K_4Fe(CN)_6$ containing acid and an alkali metal halide, the improvement consisting in adding in said solution an ionizable soluble alkaline earth salt.

2. In a method of restoring faded writings made from iron ink susceptible to oxidation with consequent color fading in which the writing is treated with an aqueous solution of an alkali metal ferrocyanide of the group consisting of $Na_4Fe(CN)_6$ and $K_4Fe(CN)_6$ containing acid and an alkali metal halide the improvement consisting in adding in said solution at least one ionizable salt of a metal of the group consisting of calcium and barium.

3. That method of restoring faded writing on paper made from iron ink susceptible to oxidation with consequent color fading comprising treating the paper with an acidified solution in water of an alkali metal ferrocyanide of the group consisting of $Na_4Fe(CN)_6$ and $K_4Fe(CN)_6$, an alkali metal halide, and an ionizable alkaline earth metal salt, then washing the paper, and then drying it.

4. A method according to claim 3, said ferrocyanide being potassium ferrocyanide.

5. A method according to claim 4, said halide being sodium chloride.

6. A method according to claim 5, said solution being acidified with hydrochloric acid.

7. That method of restoring faded writing on paper made from iron ink susceptible to oxidation with consequent color fading comprising treating the paper with an acidified solution in water of an alkali metal ferrocyanide of the group consisting of $Na_4Fe(CN)_6$ and $K_4Fe(CN)_6$, an alkali metal halide, and at least one ionizable salt of metal of the group consisting of calcium and barium, then washing the paper, and then drying it.

8. That method of restoring faded writing on paper made from iron ink susceptible to oxidation with consequent color fading comprising treating the paper with an acidified solution in water of potassium ferrocyanide, sodium chloride, and at least one ionizable salt of metal of the group consisting of calcium and barium, then washing the paper, and then drying it.

9. That method of restoring faded writing on paper made from iron ink susceptible to oxidation with consequent color fading comprising treating the paper with an acidified solution in water of a substance of the group consisting of calcium ferrocyanide and barium ferrocyanide, then washing the paper, and then drying it.

10. A method according to claim 7 in which the paper is momentarily subjected to a water spray after removal from the treating solution and prior to the washing step.

References Cited in the file of this patent

UNITED STATES PATENTS

| | | |
|---|---|---|
| 1,296,858 | Schmidt | Mar. 11, 1919 |
| 2,182,672 | Lowy | Dec. 5, 1939 |